H. MAXWELL.
SYSTEM OF CONTROL.
APPLICATION FILED JUNE 13, 1908.
1,089,659.
Patented Mar. 10, 1914.
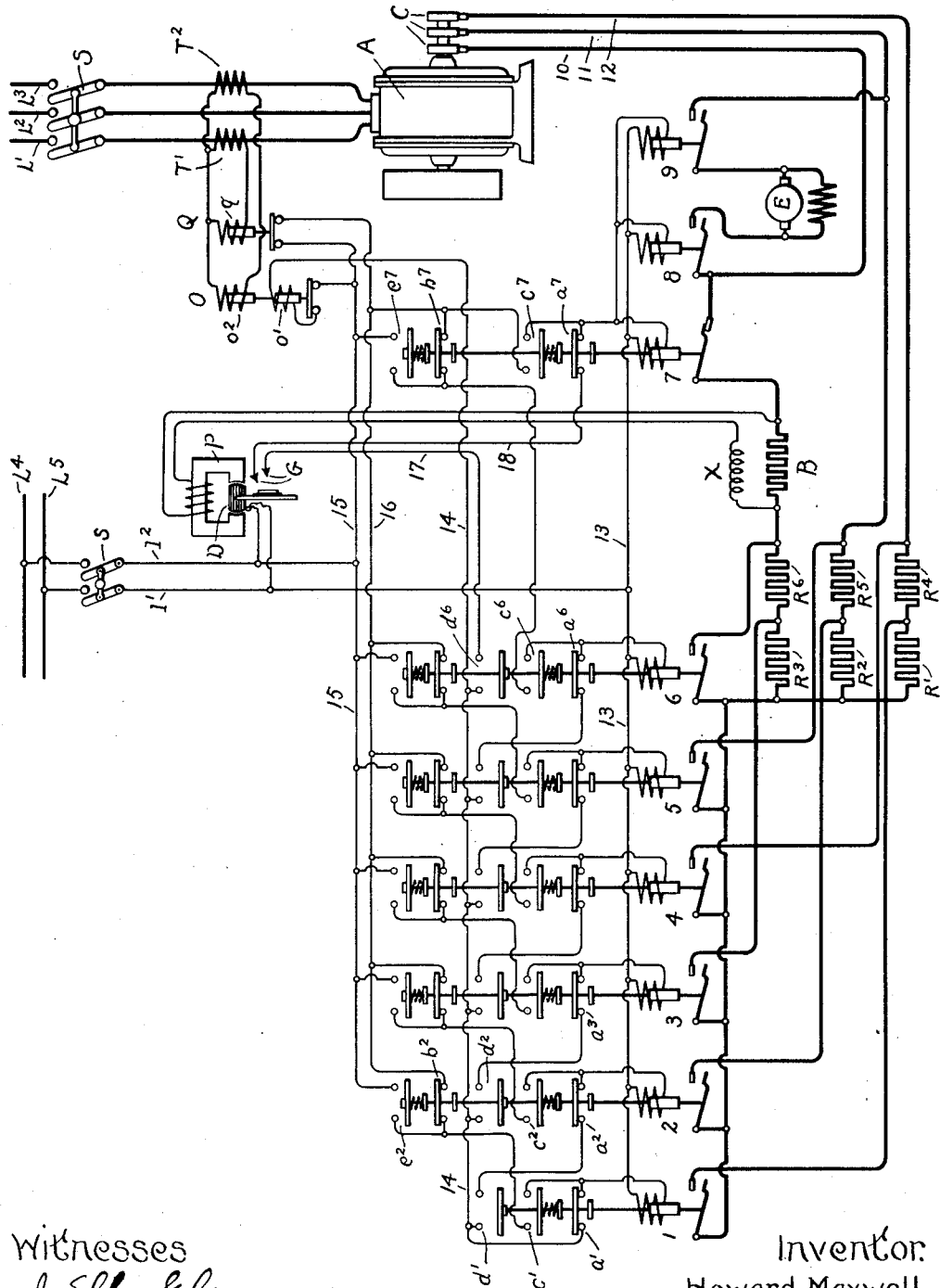
Witnesses
J. Ellis Glen
J. Earl Ryan
Inventor
Howard Maxwell
by Albert H. Davis
Atty.

UNITED STATES PATENT OFFICE.

HOWARD MAXWELL, OF SCHENECTADY, NEW YORK, ASSIGNOR TO GENERAL ELECTRIC COMPANY, A CORPORATION OF NEW YORK.

SYSTEM OF CONTROL.

1,089,659.  Specification of Letters Patent.  Patented Mar. 10, 1914.

Application filed June 13, 1908. Serial No. 438,260.

*To all whom it may concern:*

Be it known that I, HOWARD MAXWELL, a citizen of the United States, residing at Schenectady, county of Schenectady, State of New York, have invented certain new and useful Improvements in Systems of Control, of which the following is a specification.

My invention relates to a system of control for an alternating current dynamo electric machine and is particularly adapted to such a system in which an alternating current motor is automatically changed from an induction motor to a synchronous motor, depending upon load conditions.

When induction motors are used for driving rolling mills, it is necessary to build them up with large air gaps because of the hard usage to which they are subjected. As is well known, induction motors with large air gaps have very low power factors at all loads and especially when under light loads.

One of the objects of my invention is to change such a motor when running under light loads, automatically, to a synchronous motor.

To this end my invention consists in an automatic system of control for an alternating current motor comprising a resistance in the secondary circuit of said motor, means for gradually cutting said resistance out of circuit, means responsive to an overload for cutting said resistance into circuit, and means for supplying direct current to the secondary circuit of the motor. I preferably change the alternating current motor from an induction motor to a synchronous motor by means of an automatic synchronizer excited by the current flowing in the rotor or secondary circuit of the motor and arranged to open one phase thereof and introduce direct current excitation therein. My automatic synchronizer comprises a relay responsive to frequencies below a certain value and a switch arranged to be operated by the relay.

In another aspect my invention consists of the combination with an alternating current motor of a polarized relay and a circuit in which alternating current flows to excite said relay in series with a reactance, the relay being arranged to operate a switch in said circuit when the frequency of the current has been reduced to a certain value, and a source of direct current excitation arranged to be inserted into the secondary circuit of the motor upon the operation of said switch.

In still another aspect my invention consists of the combination with an alternating current circuit, a polarized relay in series with a reactance and excited by the current in said circuit, and a switch operated by the relay when the frequency of the current in said circuit has been reduced to a certain value.

Other features of novelty which characterize my invention are pointed out with particularity in the claims annexed to and forming a part of this specification. For a better understanding of my invention, however, reference may be had to the following description taken in connection with the accompanying drawing, which shows diagrammatically an induction motor arranged in accordance with my invention.

I have chosen to illustrate my invention in connection with the "notching-up" and "notching-down" motor control system of Harold E. White disclosed in his Patent No. 969,583, dated September 6, 1910. In this system of motor control, the controlling switches operate in succession not only to control the current supplied to the motor in starting or as its load decreases and it speeds up, but also at any time upon the occurrence of an overload and as long as it exists, these switches operate in reverse succession to decrease the current supplied to the motor. When this system is used in connection with an induction motor coupled to a fly wheel the controlling switches change the resistance in series with the secondary of the motor, the switches in turn being operated by relays which are actuated by variations in the line current. This change in the secondary resistance changes the torque of the induction motor and causes the motor to tend to alter its speed, thereby either delivering energy to the fly wheel on light loads or allowing the fly wheel to deliver energy to the load on overloads, thus tending to equalize the current taken from the line.

Referring to the drawing, A is an induction motor, the primary winding of which is supplied from the alternating current lines $L^1$, $L^2$, and $L^3$ through a switch S. The secondary winding is brought out to collector rings C.

E is a source of direct current excitation such as a small dynamo-electric machine, suitably driven.

The sections of resistance $R^1$, $R^2$, $R^3$, $R^4$, $R^5$ and $R^6$ are arranged to be cut in or out of the secondary circuit of the motor by means of electrically operated switches, 1, 2, 3, 4, 5 and 6. The switches 7, 8 and 9 are arranged to be operated in parallel after the resistance sections $R^1$ to $R^6$ inclusive are cut out, the switch 7 opening one line leading from the collector rings to the resistance sections, and the switches 8 and 9 practically simultaneously inserting the exciter E across the open line and the two other lines in parallel, leading from the collector rings.

The field winding of the polarized relay P is energized by a current proportional to the current in the motor circuit, and as shown in the drawing is connected across a non-inductive resistance B included in the secondary circuit of the motor.

X is a reactance in series with the field winding of relay P, and is large compared with the non-inductive resistance of the field winding of the relay, consequently the time constant of the relay will be large, and it will not operate until the frequency of the current flowing through the resistance B is reduced to a certain value. The armature D of the relay has a large inertia and may be a permanent magnet or may be excited with direct current as shown, from the lines $l^1$ and $l^2$ which are connected to the direct current mains $L^4$ and $L^5$ by means of the switch $s$. The lines $l^1$ and $l^2$ also supply current to actuate the switches 1 to 9 inclusive.

Current transformers $T^1$ and $T^2$ are placed in the lines $L^1$ and $L^3$ and supply current to the coil $o^2$ of notching relay O and to the coil $q$ of the overload relay Q, which may be of any well-known construction.

In the system shown, upon closing the switch S current is supplied to the primary of the induction motor A, and the rotor is short-circuited through all of the resistance sections. Upon closing the switch $s$ the armature D of the polarized relay is supplied with direct current, the circuit between the contacts G being open. By closing the switch $s$, current is also allowed to flow from the main $L^5$, through the line $l^1$, wire 13, actuating coil of switch 1, auxiliary switch $a^1$ of switch 1, actuating wire 14, contacts of relay O, wire 15, line $l^2$ to the main $L^4$. The switch 1 will close and in closing will first close the auxiliary switch $c^1$, then open switch $a^1$, and then close auxiliary switch $d^1$. The closing of switch $c^1$ completes a holding circuit through the contacts of overload relay Q, the wire 16, switch $b^2$, switch $c^1$, coil of switch 1, wire 13, to line $l^1$. The closing of switch $d^1$ completes an actuating circuit for the coil of switch 2 through the auxiliary switch $a^2$. The notching relay O is arranged to pull up whenever any current flows through its actuating coil $o^1$, and will therefore pull up immediately upon the closing of switch 1 and before switch 2 has had time to close, and in rising breaks its own circuit through its contacts. The coil $o^2$ on the relay O, which is supplied with current in proportion to the line current of the motor, is arranged to hold the relay in its raised position provided the current in the motor lines reaches a certain value, and will not let the core drop until the line current falls below that value. When the contacts of the relay are again closed the actuating wire 14 is again supplied with current and the coil of switch 2 is energized as pointed out above, and this switch closes. The closing of switch 2 causes: first, the closing of auxiliary switch $c^2$, which completes a holding circuit for switch 2 from the holding wire 16; second, opening of the switch $a^2$, thus breaking the actuating circuit of switch 2; third, closing of an auxiliary switch $e^2$, which completes a new holding circuit for switch 1 from line $l^2$, through the wire 15, switch $e^2$, switch $c^1$, actuating coil of switch 1, wire 13, to line $l^1$, which circuit is independent of the overload relay Q; fourth, opening of switch $b^2$, which interrupts the holding circuit of switch 1 from wire 16; and fifth, closing of switch $d^2$ which completes the actuating circuit for the coil of switch 3 from the actuating wire 14, through switch $d^2$ and $a^3$, actuating coil of switch 3 through wire 13 to line $l^1$. As explained for switch 2, the notching relay O pulls up before the switch 3 has time to close, switch 1 being held closed by current through its actuating coil direct from wire 15 without passing through the contacts of relay O. Switch 2 is also held closed by current through the contacts of relay Q and holding wire 16.

The overload relay Q is designed to operate only on a current considerably higher than that required to hold up the notching relay O, and will, therefore, not operate until the occurrence of an overload on the motor.

As the motor speeds up in starting, or as the load is lightened, the switches 4, 5, and 6 continue to operate in succession, until finally all of the sections of resistance are short circuited.

The actuating circuit of switches 7, 8 and 9 is made through the auxiliary switch $a^7$ and the contacts G on the armature of the polarized relay P. It is well-known to those skilled in the art that the current in the secondary winding of an induction motor is an alternating current with a frequency directly proportional to the "slip", which is the difference between the actual speed of the secondary and synchronous speed. Further, the lighter the load, and consequently the lower the resistances of the external secondary circuits of the motor in such a system as described, the higher will be the speed of the secondary and the lower the frequency of the current generated therein, it being well known that the "slip" is dependent upon the load and the resistance of the secondary circuits. As explained above, the reactance X is large compared with the resistance of the field of relay P, and the entire voltage drop across the resistance B will be used up in the reactance X when the frequency of the current in B and therefore that of the current in X is high. As the frequency in B decreases a larger portion of the voltage drop will be available across the field of relay P and by a proper design of the reactance and adjustment of relay P, the relay will operate to close the actuating circuit of the switches 7, 8 and 9 when the frequency of the current in the secondary circuits is reduced to a low value. A polarized relay will only operate to short-circuit its contacts when the field flux is in a certain direction with respect to the armature. Because of the large mechanical inertia of the armature of the relay and the adjustment of the reactance X, the armature begins to oscillate through a larger and larger arc as the frequency of the current in the field circuits decreases. This continues until the frequency reaches a low value, when with the correct half wave of the current the armature of the relay will swing far enough to short circuit the contacts G. The proper time for the operation of the relay is when the angular position of the secondary of the induction motor is such that the introduction of direct current excitation into the secondary winding of the motor will cause a minimum disturbance in the motor circuits.

When the relay P has short-circuited the contacts G, and the switches 1 to 6 inclusive are closed, the actuating circuits for switches 7, 8 and 9 are made from the line $l^2$, through wire 15, contacts of relay O, actuating wire 14, switch $d^6$, wire 17, contacts G, wire 18, switch $a^7$, actuating coils of the switches 7, 8 and 9 in parallel, wire 13, to line $l^1$. The operation of switches 7, 8 and 9 causes: first, the closing of switch $c^7$, which completes a holding circuit for these switches from wire 16; second, opening of switch $a^7$, thereby breaking the actuating circuit of these switches; third, closing of switch $e^7$, which completes a new holding circuit for switch 6 from wire 15 and independent of the contacts of overload relay Q; and fourth, opening of switch $b^7$, interrupting the holding circuit of switch 6 from wire 16. When switch 7 operates, the line 10 leading from one of the collector rings C to the resistance B and $R^6$ is opened. The operation of switches 8 and 9, practically simultaneously with switch 7, connects exciter E across lines 10 and 11 and thus introduces direct current excitation across two of the collector rings C, and the motor A operates as a synchronous motor.

If a heavy load is thrown on the motor, the amount of current in the lines $L^1$, $L^2$ and $L^3$ will reach a value sufficient to operate the overload relay Q, which will break the holding circuit of the switches 7, 8 and 9 from the wire 16. This will cut the exciter out of circuit and complete the secondary circuit of the motor through the short-circuit around the resistance sections. This will slow the motor down because it will now act as an induction motor. If this does not tend to reduce the motor speed enough to allow the fly wheel to give up enough of its energy to reduce the motor current, or in cases where fly-wheels are not used, it is not a sufficient reduction of the motor speed and load to cut down the motor current to a value such that the relay Q will drop, the switch 6 will also open, reinserting resistance $R^6$ in the motor circuit. It will thus be seen that the relay Q will operate to open the switches 1 to 7 in reverse order in case of the occurrence of a load for which the relay Q is designed to open and will remain open until the motor current is reduced to a value below that sufficient to operate the relay Q.

I have illustrated my invention in connection with a particular system of automatic motor control, but it is evident to those skilled in the art, that it may be used in connection with any automatic system. My invention is not limited to an induction motor but may be used with a synchronous motor which starts as an induction motor, nor is it limited to a motor of any particular number of phases.

My automatic synchronizer may also be used for coupling synchronous alternating current machines in parallel and will operate in a manner similar to that described in connection with the operation of the switch for changing the induction motor to a synchronous motor.

What I claim as new and desire to secure by Letters Patent of the United States, is,—

1. In combination, an alternating current motor having a secondary circuit, a resistance in the secondary circuit of said motor, a source of direct current excitation, automatic means for gradually cutting said resistance out of circuit and for connecting said source of direct current excitation in the secondary circuit of said motor when the motor is operating near synchronous speed, and means responsive to an overload for disconnecting said source and for cutting said resistance into circuit.

2. In combination, an alternating current motor having a secondary circuit, a source of direct current excitation, and automatic means for connecting said source of direct current excitation in the secondary circuit of said motor when the motor is operating near synchronous speed and for disconnecting said source of direct current excitation when the motor is heavily loaded.

3. In combination, an alternating current motor having a secondary circuit, a source of direct current excitation, automatic means for connecting said source of direct current excitation in the secondary circuit of said motor when the motor is operating near synchronous speed, and means responsive to an overload for disconnecting said source.

4. The combination with an alternating current motor having a secondary circuit, of a relay, a circuit in which alternating current flows to excite said relay, a reactance in series with said relay, a switch arranged to be operated by said relay when the frequency of the current in said circuit has been reduced to a certain value, and a source of direct current excitation arranged to be inserted into the secondary circuit of said motor upon the operation of said switch.

5. The combination with an alternating current motor having a secondary circuit, of a polarized relay, a circuit in which alternating current flows to excite said relay, a reactance in series with said relay and so proportioned that the relay will not operate until the frequency of the current in said circuit has been reduced to a certain value, a switch in said circuit controlled by said relay, and a source of direct current excitation arranged to be inserted into the secondary circuit of said motor upon the operation of said switch.

6. The combination with an alternating current circuit, of a resistance in series therewith, a relay arranged to be excited by the voltage drop across said resistance, a reactance in series with said relay, and a switch in said circuit controlled by said relay.

7. The combination with an alternating current circuit of a resistance in series therewith, a polarized relay arranged to be excited by the voltage drop across said resistance, a reactance in series with said relay, and a switch in said circuit controlled by said relay, said reactance and relay being so arranged that the relay will not operate until the frequency of the current in said circuit has been reduced to a certain value and the alternating current wave is in a certain direction, thereby causing a minimum disturbance in the circuit upon the closing of the switch.

8. The combination with an alternating current motor having a secondary circuit, of a resistance in series with the secondary circuit of the motor, a relay arranged to be excited by the voltage drop across said resistance, a reactance in series with said relay, and switches arranged to be operated by said relay to open the secondary circuit and introduce direct current excitation therein.

9. The combination with an alternating current motor having a secondary circuit, of a resistance in series with the secondary circuit of the motor, a polarized relay arranged to be excited by the voltage drop across said resistance, a reactance in series with said relay, and switches controlled by said relay to open the secondary circuit of said motor and introduce direct current excitation therein, said reactance being so proportioned that the relay will not operate until the frequency of the current in the field circuit has been reduced to a certain value.

10. The combination with an alternating current circuit, of an automatic synchronizer comprising a polarized relay excited by the current flowing in said circuit, a reactance in series with said relay, and a switch in said circuit arranged to be operated by said relay when the frequency of the current in said circuit has been reduced to a certain value.

11. The combination with an alternating current circuit, of a relay excited by the current flowing in said circuit, a reactance in series with said relay, and a switch in said circuit arranged to be operated by said relay, said reactance being so proportioned that the relay will not operate until the frequency of the current in said circuit has been reduced to a certain value.

12. In combination, an alternating current motor having a secondary circuit, a plurality of electrically operated switches, means for causing the successive closing of said switches, means responsive to an overload for causing the opening of said switches in the reverse order of their closing, a reactance, a relay in series with said reactance and also controlling the operation of the last of said switches, and a source of direct current excitation arranged to be inserted in the secondary circuit of the motor upon the operation of said last switch.

13. In combination, an alternating current motor having a secondary circuit, a plurality of electrically operated switches, means for causing the successive closing of said switches, means responsive to an overload for causing the opening of said switches in the reverse order of their closing, a relay in said secondary circuit also controlling the operation of the last of said switches, a reactance in series with said relay and so proportioned that the relay will not operate until the frequency of current in said circuit has been reduced to a certain value, and a source of direct current excitation arranged to be inserted into the secondary circuit of the motor upon the operation of said last switch.

14. In combination, an alternating current motor having a secondary circuit, a plurality of electrically operated switches, means for causing the successive closing of said switches, means responsive to an overload for causing the opening of said switches in the reverse order of their closing, a resistance in said secondary circuit, a relay arranged to be excited by the voltage drop across said resistance and also to control the operation of the last of said switches, a reactance in series with said relay and a source of direct current excitation arranged to be inserted into the secondary circuit of the motor upon the operation of said last switch.

15. In combination, an alternating current motor having a secondary circuit, a plurality of electrically operated switches, means for causing the successive closing of said switches, means responsive to an overload for causing the opening of said switches in the reverse order of their closing, a resistance in said secondary circuit, a polarized relay arranged to be excited by the voltage drop across said resistance and to control the operation of the last of said switches, a reactance in series with said relay and proportioned so that the relay will not operate until the frequency of the current in said circuit has been reduced to a certain value, and a source of direct current excitation arranged to be inserted in the secondary circuit of the motor upon the operation of said last switch.

In witness whereof, I have hereunto set my hand this 11th day of June, 1908.

HOWARD MAXWELL.

Witnesses:
    BENJAMIN B. HULL,
    HELEN ORFORD.